(No Model.)
E. H. GRAHAM.
TAG HOLDER AND FASTENER.
No. 360,680. Patented Apr. 5, 1887.
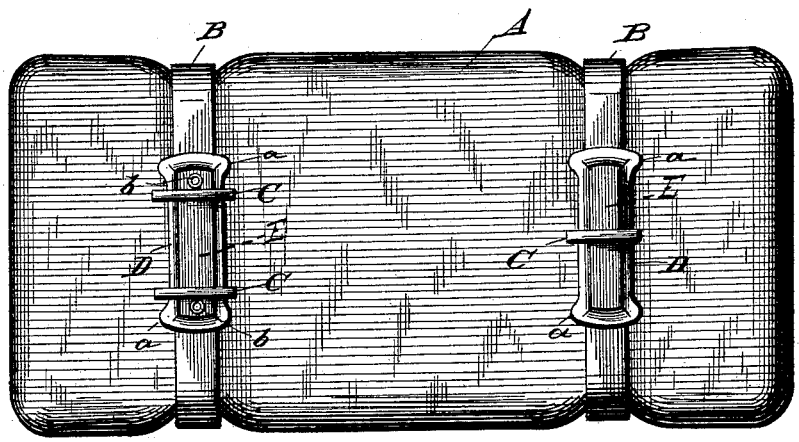
Fig. 1.
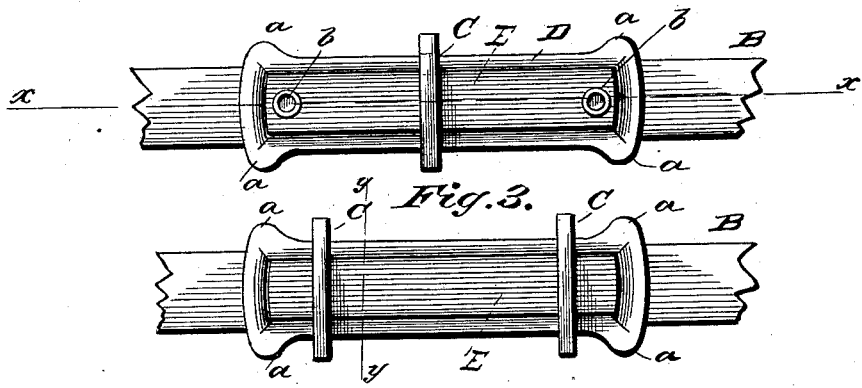
Fig. 2.
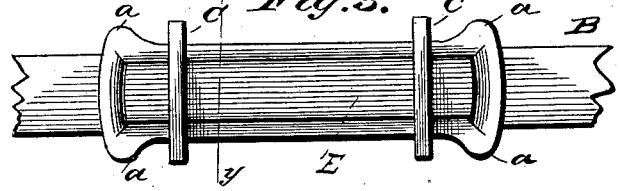
Fig. 3.
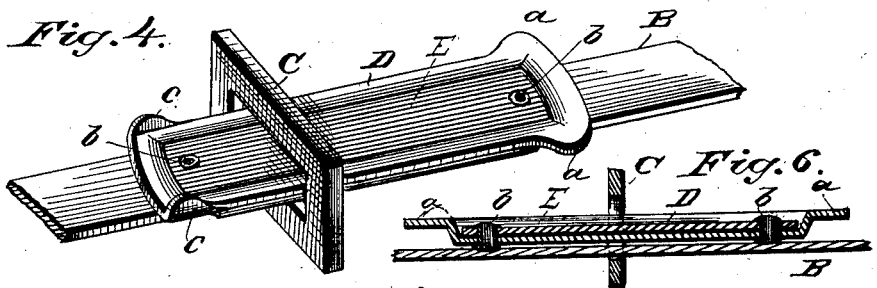
Fig. 4.
Fig. 6.
WITNESSES
Phil C. Dieterich.
E. Everett Ellis.
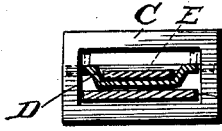
Fig. 5.
INVENTOR
Edmund H. Graham
By Wm. C. W. Entire Attorney
N. PETERS, Photo-Lithographer, Washington, D. C.

United States Patent Office.

EDMUND H. GRAHAM, OF BIDDEFORD, MAINE, ASSIGNOR OF ONE-HALF TO GEORGE R. ANDREWS, OF SAME PLACE.

TAG HOLDER AND FASTENER.

SPECIFICATION forming part of Letters Patent No. 360,680, dated April 5, 1887.

Application filed July 15, 1886. Serial No. 208,144. (No model.)

*To all whom it may concern:*

Be it known that I, EDMUND H. GRAHAM, a citizen of the United States, residing at Biddeford, in the county of York and State of Maine, have invented new and useful Improvements in Tag Holders and Fasteners, of which the following is a specification.

This invention relates to certain new and useful improvements in tag holders and fasteners designed for use upon cotton and other bales; and it consists, substantially, in the same as constructed, and in the particular combinations of parts, hereinafter more particularly described, and pointed out in the claims.

In many former inventions of a like character the construction of the holders and the modes of fastening the same to the bands which surround the bale have been such as that both the tag holder and fastener soon become unfit for use, owing to the damaging effect produced thereon by rough handling of the bales in transportation or shipment, and in other instances the modes of fastening the holders upon the bales are so insecure that the said tag-holders frequently become detached and are lost. Further, while there are other devices in use which may be remedial of the defects above mentioned, yet in practice it has been found that they require vastly too much time in attaching them to and removing them from the bales, the greatest desideratum being a tag holder and fastener therefor which can be manipulated in the shortest space of time and with the least expenditure of labor to the operator.

The object of my invention is to provide a tag holder and fastener of a construction by which an easy, rapid, and secure fastening of the holder can be effected, thereby economizing in time and labor; further, to lessen the cost of manufacture thereof as compared with many former inventions for an analogous purpose; further, to insure against loss of the tag-holder from the bales, and, finally, to supply a combined tag holder and fastening that shall be less susceptible to injury or damage from rough handling of the bales in shipment or transportation.

Referring to the accompanying sheet of drawings, Figure 1 represents a side view of a cotton or other bale upon which my improvements are employed. Fig. 2 represents an enlarged top view of the holder, showing the employment of but one fastener or loop. Fig. 3 represents a similar view in which two loops or fasteners are resorted to. Fig. 4 is a view in perspective showing the manner of bending the end of the holder for slipping it through the loop or fastener. Fig. 5 is a cross-section of Fig. 3 on the line $y\ y$, and Fig. 6 represents a longitudinal sectional view of Fig. 2 on the line $x\ x$.

My invention embodies in its organization one or more sliding loops or clasps, intended to be slipped upon the bale-bands at the time of baling, and an elongated holder for the tag having widened or enlarged ends, which are adapted to be bent inward to permit insertion thereof in the loop, and again bent or turned outward to be retained in the loop and thereby fastened to the band.

Reference being had to the several parts by the letters marked thereon, A represents an ordinary cotton or other bale, and B B the bands which surround the same.

C designates a loop or fastener, which is placed upon the bale-band previous to fastening the same around the bale, one of which loops being found to answer the purpose of a fastener for the tag-holder; but in some instances it has been found preferable to employ one at each end of the holder, as a more perfect security against damage and loss, both employments thereof being clearly shown in the drawings.

D represents the tag-holder, consisting of a strip of tin or other suitable metal, preferably of an oblong form and slightly "dished" for the reception of the tag E, on which are inscribed the name and address of the consignee, the said holder being also provided at each end with lateral wings or enlargements $a$, which act to retain the device in the loop adjacent to the bale-band, as shown. The tags E are either secured to the holder by eyelets $b\ b$, as seen in Fig. 2, or they may be secured thereto by gumming in the ordinary and well-known manner.

The purpose of dishing the holder is to enable a quantity of the tags to be placed therein, as in the manner of a tablet, and at the same time to bring their upper surfaces out of contact with the loop or fastener C, so that no abrasion thereof or destruction of the address will be had from the latter; and the lateral wings *a a* act to retain the said holders in the loops after insertion. The manner of insertion is by simply bending these wings inwardly, as seen at *c*, Fig. 4, then slipping the end through the loop and again bending the wings outwardly; and it is evident that a rapid and secure fastening will be had. In practice it has been found best to form the loops or fasteners C of a size by which to slightly bind the holder D to the bale-band, for then the holder will be confined to its place upon the band and no slipping of the loop will be had. In some instances I employ but one of the loops, about centrally of the holder, while in others I employ a loop at near each end of the holder, both as shown.

From the foregoing description it is thought the operation of my invention will be thoroughly understood, and while I have set forth certain peculiarities of construction of the several parts, it should be remarked that I do not wish to confine myself thereto in precise detail, for it is evident that very material changes or alterations therein could be made and still be within the scope of my invention. For instance, instead of dishing the holder for the tags, I may employ a simple flat strip of metal having widened extremities.

Having thus described my invention, what I claim as new, and desire to secure by Letters Patent, is—

1. A tag holder and fastener for cotton and other bales, consisting of an oblong strip of metal having its ends or extremities extended or projected laterally beyond the body thereof and capable of being bent, as described, in combination with a securing-loop having an opening or slot therein shorter than the extended ends of the strip and capable of receiving the body of the same, substantially as and for the purposes hereinbefore set forth.

2. The combination, with the band of a cotton or other bale, of the loop C thereon, and the holder D, dished for the reception of the tags and having lateral wings *a a* at each end, adapted to be bent or turned inwardly for insertion through the loop and again bent outwardly to be retained in such loop, in the manner and for the purpose described.

In testimony whereof I have hereunto set my hand in the presence of two subscribing witnesses.

EDMUND H. GRAHAM.

Witnesses:
GEORGE R. ANDREWS,
CORNELIUS HOUGAN.